Nov. 19, 1957 R. A. DAVIS 2,814,031

MAGNETIC STORAGE KEYBOARD

Filed Aug. 26, 1955 2 Sheets-Sheet 1

INVENTOR
RODERIC A DAVIS

BY Joe L. Koerber

ATTORNEY

MAGNETIC STORAGE KEYBOARD

Filed Aug. 26, 1955 2 Sheets-Sheet 2

INVENTOR
RODERIC A DAVIS

BY Joe L. Koerber
ATTORNEY

United States Patent Office 2,814,031

Patented Nov. 19, 1957

2,814,031

MAGNETIC STORAGE KEYBOARD

Roderic A. Davis, Hopewell Junction, N. Y., assignor to International Business Machines Corporation, New York, N. Y., a corporation of New York Application August 26, 1955, Serial No. 530,675

9 Claims. (Cl. 340—174)

This invention relates to a data storage keyboard and more particularly to a keyboard wherein data are stored in magnetizable cores.

In many accounting and calculating machines for handling digital data or alphabetic and digital data, much of the data handled are contained in previously prepared records or are derived from various calculating machines. It frequently is desirable to manually enter data interspersed with the data derived from other sources. One manner of accomplishing this objective is through the use of a storage keyboard in which the additional data are manually entered to be read out when required. Various storage keyboards are disclosed in prior art.

In accordance with the above requirements, it is the principal object of this invention to provide a novel and improved storage keyboard.

Another object of the invention is to provide a storage keyboard embodying the principles of magnetic core storage and readout of data.

A further object of the invention is to provide a storage keyboard wherein data may be entered by selectively coupling intersecting leads inductively whereby an interrogation pulse on one of the coupled leads causes a readout pulse on the other of the coupled leads.

Other objects of the invention will be pointed out in the following description and claims and illustrated in the accompanying drawings, which disclosed, by way of example, the principle of the invention and the best mode, which has been contemplated, of applying that principle.

Although the novelty of this invention lies in the storage keyboard per se, the keyboard is described in connection with the circuits of a record perforating machine as one illustration of its many applications. A perforating machine with which the novel keyboard may be used is shown and described in detail in an application Serial No. 509,505, filed May 19, 1955, and is referred to hereinafter as the machine. The machine includes a storage keyboard for which the novel keyboard described hereinafter may be substituted. The machine is described herein only to the extent necessary to the understanding of the function of the novel storage keyboard. Reference may be made to the above cited co-pending application for additional details.

The machine is adapted to automatically process Hollerith type record cards in accordance with data set up in the storage keyboard. Data are manually keyed into the storage keyboard and, at a particular time of the machine cycle, electrical pulses serially interrogate the various orders of the storage keyboard and readout lines, common to all orders of the storage keyboard and having assigned values, are pulsed in accordance with the values keyed in the storage keyboard.

*Structure*

Figure 2:
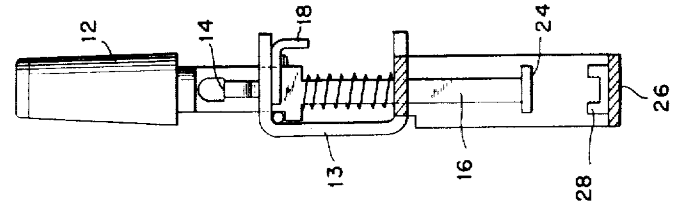
Figure 2 is an end view of the key unit shown in Figure 1 with portions broken away.
Figure 1:
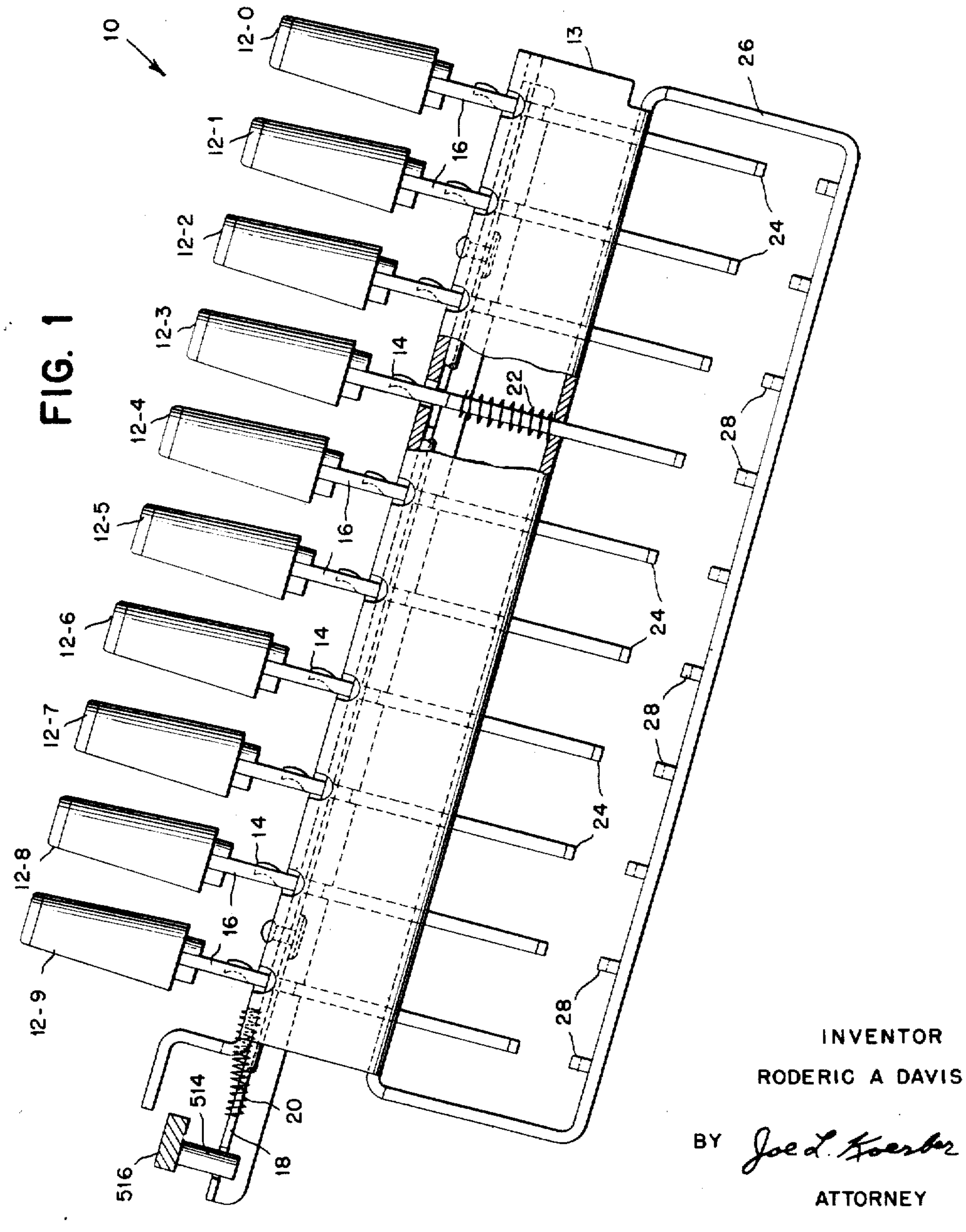
Figure 1 is a side elevational view of a one order key unit for a storage keyboard.

Referring to Figures 1 and 2, one order of the novel storage keyboard, generally designated 10, is shown. All orders of the keyboard are similar so the description of one will suffice for all. The magnetic storage keyboard keys, designated 12–0 through 12–9 are slidably mounted in a channel member 13 and may be latched in a depressed position by cam surfaces 14 provided on each key stem 16 and by a slotted bail 18. The bail 18 is biased to the left, by a spring 20 that is anchored to the channel member 13, in which position the bail 18 latches a depressed key 12. Each key 12 is biased upwardly by a spring 22, one of which is shown in a cutaway portion of Figure 1.

The latched keys of the usual storage keyboard described in the above cited application, are reset through the action of an arm and a bail, therein designated respectively 514 and 516. The arm 514 and the bail 516 are partially shown in Figure 1 and operate to move the slotted bail 18 to the right whereby any actuated key 12 is released. The operation of the arm 514 and bail 516 is fully described in the above cited application.

A segment 24 of magnetizable material is mounted on the lower end of each key stem 16. A bracket member 26 is suitably mounted on the channel member 13 and, in alignment with the segments 24, supports partial core segments 28 of magnetizable material. When a key 12 is depressed, it is latched in a position wherein the attached magnetizable segment 24 contacts a corresponding one of the magnetizable partial core segments 28, to complete a magnetic path for a purpose described hereinafter.

*Circuit description*

Figure 3:
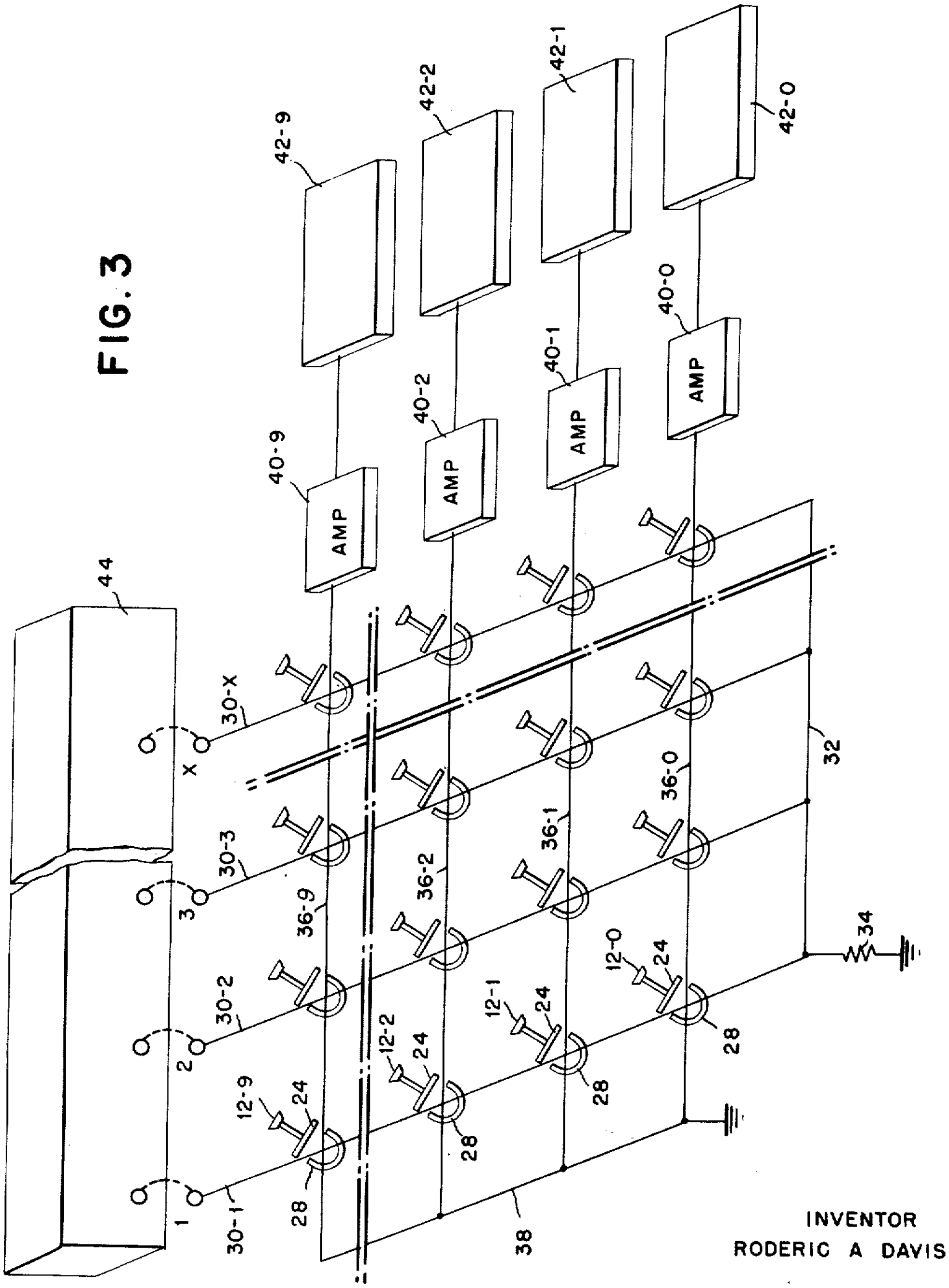
Figure 3 is a schematic representation of the keyboard.

Referring to Figure 3, a schematic representation of the storage keyboard 10 is shown. The keyboard comprises a number of interrogation lines 30, four of which are shown and further designated 30–1, 30–2, 30–3, and 30–X. It will be understood as indicated by the break between the lines 30–3 and 30–X, that any desired number of orders may be provided. Each interrogation line 30 is common to all the core segments 28 of a single order. The interrogation lines 30 are common connected by a line 32 through a resistor 34 to ground.

Ten readout lines 36, four of which are shown, further designated 36–0 through 36–9, are provided, each line being common to corresponding core segments 28 of each order. The lines 36 are common connected by a line 38 to ground. The opposite ends of the lines 36–0 through 36–9 are connected to corresponding amplifiers 40, that are further designated 40–0 through 40–9. The outputs of the amplifiers 40 are fed respectively to load devices 42 that are further designated 42–0 through 42–9.

In the machine described in the above cited application, means are provided for serially pulsing the interrogation lines of the usual storage keyboard. The connections to the keyboard are pluggable and the novel keyboard described herein may be readily substituted for the usual keyboard. The means for providing the interrogation pulse are shown and described in detail in the above cited application and therefore are shown schematically in Figure 3, only as a box designated 44. However, it will be understood that any suitable means may be used for providing the interrogation pulses.

The amplifiers 40 may be conventional amplifiers. The load devices 42 may be the add relays referred to in the above cited application or may be any suitable load devices capable of utilizing the readout pulses.

When a key 12 is actuated and a segment 24 is latched in contact with a corresponding core segment 28, a magnetizable path is formed around the wires 30 and 36 that intersect within that particular core segment. When an interrogation pulse is passed through the particular interrogation line 30, the common line 32 and the common resistor 34 to ground, the completed core comprising the segment 24 and the segment 28 is magnetized and the particular readout line 36, intersecting the pulsed interrogation line within the magnetized core, is magnetically coupled with the pulsed interrogation line and a readout pulse is induced therein. The pulse induced in the line 36 is amplified by the conventional amplifying means 40 connected thereto.

It will be apparent that data may be keyed into the various storage keyboard orders and, when the interrogation lines 30 are serially interrogated through pulses from the unit 44, the readout lines 36–0 through 36–9 will be pulsed in accordance with the data keyed in successive keyboard orders. The pulses are utilized in the suitable load devices 42, for example, the add relays described in the hereinbefore cited co-pending application.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic storage device comprising, in combination, a data interrogation line, a data readout line intersecting said interrogation line, means forming a partial magnetic core around said intersection, means operable for completing said core and means for pulsing said interrogation line whereby said readout line is pulsed if said core is complete.

2. A magnetic storage device comprising, in combination, a matrix including a plurality of interrogation lines intersecting a plurality of readout lines, means forming partial magnetic circuits around said intersections, means associated with each said partial magnetic circuit operable selectively in accordance with values assigned to said interrogation and said readout lines for completing said magnetic circuits, means for operating said selectively operable means, and means for pulsing said interrogation lines in a predetermined order whereby said readout lines are pulsed in accordance with values set up by said selectively operable means.

3. A magnetic storage keyboard comprising, in combination, a matrix including a plurality of interrogation lines intersecting a plurality of readout lines, means forming partial magnetic cores around said intersections, manual means for completing said cores selectively in accordance with values assigned to said interrogation and said readout lines, and means for pulsing said interrogation lines in a predetermined order whereby said readout lines are pulsed in accordance with values set up with said manual means.

4. A magnetic storage device comprising, in combination, a matrix including a plurality of interrogation lines having denominational designations and intersecting a plurality of readout lines having digital designations, means forming partial magnetic cores around said intersections, keying means for completing said cores selectively in accordance with said digital and denominational designations, means for pulsing said interrogation lines successively by denominational orders whereby said digital readout lines are pulsed in accordance with a multi-denominational number set up by said keying means.

5. A magnetic storage keyboard comprising in combination, a data interrogation line, a data readout line intersecting said interrogation line, means forming a partial magnetic core around said intersection, manually operable means for completing said core, means for retaining said operable means in its operated position, means for pulsing said interrogation line whereby said readout line is pulsed if said core is complete, and means for releasing said retaining means whereby said operable means is restored to its unoperated position.

6. A magnetic storage keyboard comprising, in combination, a plurality of key levers, a matrix including a plurality of interrogation lines intersecting a plurality of readout lines, means forming partial magnetic cores around said intersections, means operable by said key levers in accordance with values assigned to said interrogation and said readout lines for completing said cores selectively, means for retaining said operable means in operated position, means for pulsing said interrogation lines in a predetermined order whereby said readout lines are pulsed in accordance with values set up by operated ones of said operable means and means for releasing said retaining means whereby said operable means are restored to unoperated position.

7. A magnetic storage keyboard comprising, in combination, a matrix including a plurality of interrogation lines intersecting a plurality of readout lines, means forming partial magnetic cores around said intersections, manual means for completing said cores selectively in accordance with values assigned to said interrogation and said readout lines, means for retaining said manual means in operated position, means for pulsing said interrogation lines in a predetermined order whereby said readout lines are pulsed in accordance with values set up by said manual means, and means for releasing said retaining means whereby said manual means are restored to unoperated position.

8. A magnetic storage keyboard comprising, in combination, a matrix including a plurality of interrogation lines having denominational designations and intersecting a plurality of readout lines having digital designations, means forming partial magnetic cores around said intersections, keying means for completing said cores selectively in accordance with said digital and denominational designations, means for retaining said keying means in operated position, means for pulsing said interrogation lines successively by denominational orders whereby said digital readout lines are pulsed in accordance with a multi-denominational number set up in said keying means and means for releasing said keying means whereby said keying means are returned to unoperated positions.

9. A magnetic storage keyboard comprising, in combination, a matrix including a plurality of interrogation lines, intersecting a plurality of readout lines; means forming partial magnetic cores around said intersections, keying means for completing said cores selectively in accordance with said digital and denominational designations, said keying means including a plurality of units each associated with one of said interrogation lines and comprising a plurality of digitally designated keys, means for latching each of said keys in a depressed position, a core segment fixed to each of said keys for completing corresponding ones of said partial magnetic cores and means operable for releasing said latched keys; means for pulsing said interrogation lines successively by denominational orders whereby said digital readout lines are pulsed in accordance with a multi-denominational number set up in said keying means and means for operating said operable key-releasing means.

References Cited in the file of this patent

UNITED STATES PATENTS

| | | |
|---|---|---|
| 2,003,329 | Young | June 4, 1935 |
| 2,700,703 | Nordyke | Jan. 25, 1955 |

U. S. DEPARTMENT OF COMMERCE

PATENT OFFICE

CERTIFICATE OF CORRECTION

November 19, 1957

Patent No. 2,814,031

Roderic A. Davis

It is hereby certified that error appears in the printed specification of the above numbered patent requiring correction and that the said Letters Patent should read as corrected below.

Column 2, line 8, for "The" read --Ten--; column 3, line 60, for "device" read --keyboard--; line 71, for "keyboard" read --device--.

Signed and sealed this 6th day of May 1958.

(SEAL)
Attest:

KARL H. AXLINE

Attesting Officer

ROBERT C. WATSON
Commissioner of Patents

Disclaimer 2,814,031.—*Roderic A. Davis*, Hopewell Junction, N.Y. MAGNETIC STORAGE KEYBOARD. Patent dated Nov. 19, 1957. Disclaimer filed July 13, 1960, by the assignee, *International Business Machines Corporation.*

Hereby enters this disclaimer to claims 1, 2, 3, and 4 of said patent.

[*Official Gazette August 23, 1960.*]